(12) United States Patent
Verd et al.

(10) Patent No.: US 12,316,034 B2
(45) Date of Patent: May 27, 2025

(54) ANTENNA ARRAY FOR PASSIVELY MODULATING RADIO FREQUENCY SIGNALS

(71) Applicant: The United States of America as represented by the Secretary of the Navy, San Diego, CA (US)

(72) Inventors: Frederick Joseph Verd, Santee, CA (US); John Meloling, San Diego, CA (US); Hoa Phan, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 185 days.

(21) Appl. No.: 18/341,413

(22) Filed: Jun. 26, 2023

(65) Prior Publication Data

US 2024/0429613 A1    Dec. 26, 2024

(51) Int. Cl.
*H01Q 3/24* (2006.01)
*H01Q 9/04* (2006.01)
*H04L 27/12* (2006.01)

(52) U.S. Cl.
CPC .......... *H01Q 9/0435* (2013.01); *H04L 27/12* (2013.01)

(58) Field of Classification Search
CPC .. H01Q 3/24; H01Q 3/46; H01Q 9/04; H01Q 9/0435; H01Q 15/14; H01Q 19/10; H01Q 21/00; H04L 27/12
See application file for complete search history.

(56) References Cited

U.S. PATENT DOCUMENTS

| | | | | |
|---|---|---|---|---|
| 10,003,130 B2* | 6/2018 | Wong | | H01Q 9/145 |
| 10,224,626 B1* | 3/2019 | Pajona | | H04B 7/0404 |
| 11,063,354 B2* | 7/2021 | Jan | | H01Q 21/24 |
| 12,095,168 B2* | 9/2024 | Lenets | | H01Q 19/10 |
| 12,224,499 B2* | 2/2025 | Ghosh | | H01Q 5/307 |
| 2012/0263163 A1 | 10/2012 | Burzigotti et al. | | |
| 2021/0159608 A1 | 5/2021 | Verd et al. | | |
| 2021/0406490 A1 | 12/2021 | Phan et al. | | |

* cited by examiner

*Primary Examiner* — Tho G Phan
(74) *Attorney, Agent, or Firm* — Naval Information Warfare Center Pacific; Kyle Eppele; Evan Hastings

(57) ABSTRACT

Antenna Array for passively modulating radio frequency signals. Specifically, an antenna array or system comprising a plurality of retroreflective antennas configured to passively receive a radiofrequency (RF) signal from a source, and configured to reflect the RF signal; and a passive modulation circuit, electrically connected to the plurality of retroreflective antennas, configured to modulate the RF signal to represent a code, wherein the code comprises information, and further comprising: a plurality of RF switches. Additionally, a method for passively reflecting modulated signals, comprising generating a radiofrequency (RF) signal at a source; receiving the a RF signal with a plurality of retroreflective antennas; passively modulating the signal's amplitude to create a modulated RF signal, wherein the modulated RF signal comprises a code, and wherein the code further comprises a unique identifier associated with the plurality of retroreflective antennas; and passively reflecting a modulated signal back to the source.

9 Claims, 6 Drawing Sheets

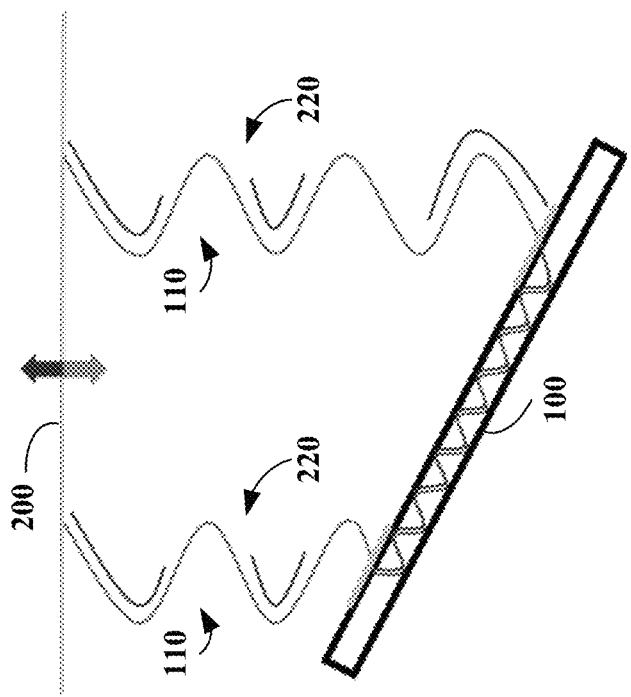
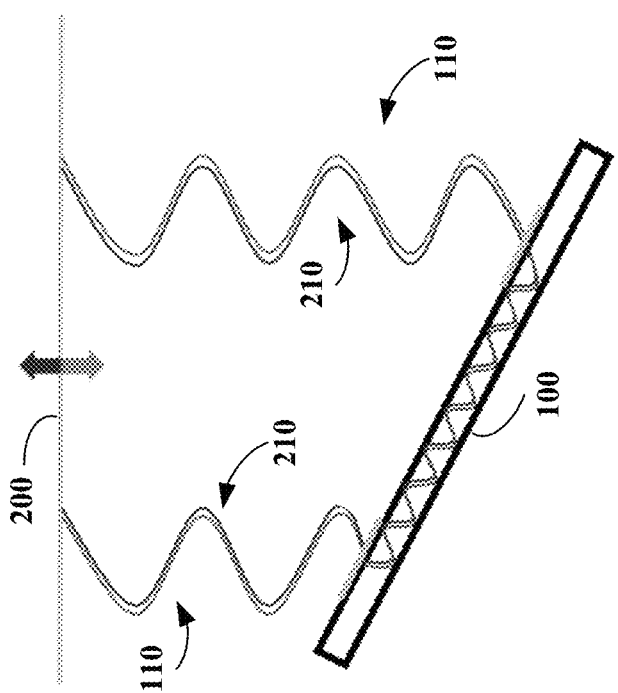
Fig. 2A
Fig. 2B

ANTENNA ARRAY FOR PASSIVELY MODULATING RADIO FREQUENCY SIGNALS

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fet@us.navy.mil, referencing Navy Case 210,097.

BACKGROUND

Earth's atmosphere is continuously being populated with more satellites and flying objects. Determining a satellite or flying object's identity typically requires that satellite or object to continuously transmit a coded signal towards potential recipients. To identify the object, the coded signal must then be received and decoded by the recipient. Continuously transmitting a signal requires an on board power source and a communication system. There is an ongoing desire to reduce power requirements, size, and efficiency of flying systems. Accordingly, better transmission techniques and systems are needed.

SUMMARY

According to illustrative embodiments, is claimed: an antenna array, comprising: a plurality of retroreflective antennas configured to passively receive a radiofrequency (RF) signal from a source, and configured to reflect the RF signal; and a passive modulation circuit, electrically connected to the plurality of retroreflective antennas, configured to modulate the RF signal to represent a code, wherein the code comprises information, and further comprising: a plurality of RF switches. Moreover, the antenna array of claim 1 may further comprise a diode detector.

Additionally, a method for passively reflecting modulated signals, comprising generating a radiofrequency (RF) signal at a source; receiving the a RF signal with a plurality of retroreflective antennas; passively modulating the signal's amplitude to create a modulated RF signal, wherein the modulated RF signal comprises a code, and wherein the code further comprises a unique identifier associated with the plurality of retroreflective antennas; and passively reflecting a modulated signal back to the source.

Additionally, an antenna system, comprising a slot-fed dual horse shoe circularly-polarized broadband antenna, coupled to a satellite, and configured to receive a radiofrequency (RF) signal from a ground station; and a passive modulation circuit, electrically connected to the plurality of retroreflective antennas, configured to modulate the RF signal to represent a code, wherein the code comprises information, and further comprising a plurality of RF switches.

It is an object to provide an Antenna Array for Passively Modulating Radio Frequency Signals that offers numerous benefits, including passive signal reception, modulation, and reflection for passively identifying and/or receiving transmitting information from satellites or flying objects.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 2A illustrates one embodiment of signal reflection, without modulation.

FIG. 2B illustrates one embodiment of signal reflection, with modulation.

DETAILED DESCRIPTION OF EMBODIMENTS

The disclosed apparatus, system, and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus, system, and method described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
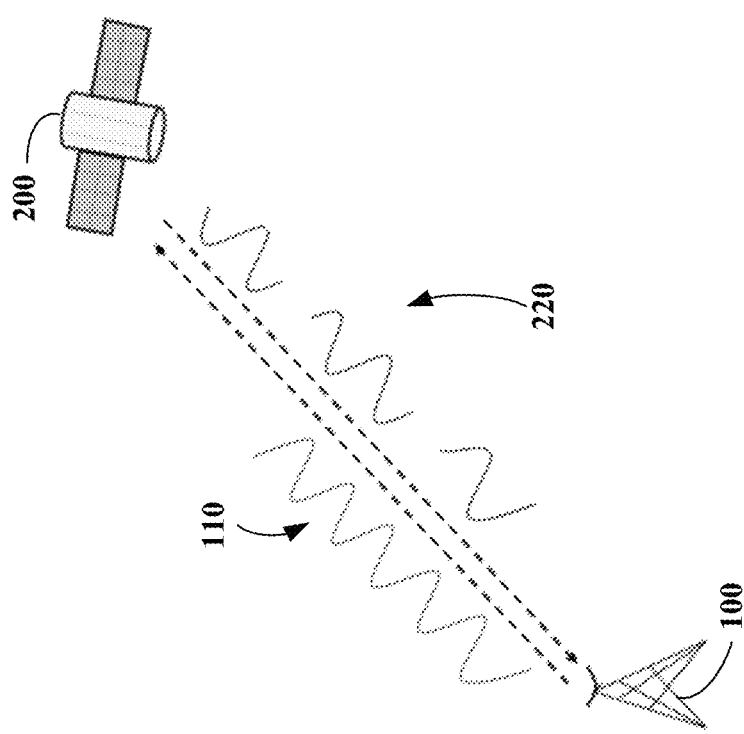
FIG. 1 illustrates one embodiment of an antenna for passive signal reflection of unique identifiers.

FIG. 1 illustrates one embodiment of an antenna system, comprising a source 100, signal 110, retroreflective antenna array 200, and modulated signal 220. In one embodiment, the antenna array 200 may be a plurality of antennas. The source 100 is capable of transmitting and receiving a radiofrequency (RF) signal. In one embodiment, the source 100 comprises a ground station. The signal 110 is a radiofrequency signal which may also be a microwave signal. In another embodiment, the RF signal may be a narrow-beam circularly polarized radar signal. The retroreflective antenna array 200 may receive RF signals 110 and reflect them back to their source 100. Additionally, the retroreflective antenna array 200 may be passive, requiring no power source to receive and reflect a signal 110. Instead of transmitting the reflected signal with an active circuit, the antenna array 200 utilizes the energy within the signal to receive and reflect. In one embodiment, the antenna 200 may be a slot-fed dual horse shoe circularly-polarized broadband antenna. Finally, the signal 110 may be turned into a modulated signal 220, passively, and reflected from the retroreflective antenna array 200. As shown in FIG. 1, the modulated signal may be pulsating form of the signal 110, wherein the amplitude of the signal 110 has been modulated. One exemplary mode of modulation may be amplitude modulation via a plurality of switches 320 to either an "on" or "off" state.

FIG. 2A illustrates one embodiment of signal reflection without modulation, comprising the source 100, signal 110, reflected signal 210, and retroreflective antenna array 200. As shown in FIG. 2A, the signal 110 may originate from the source 100 and be reflected as a reflected signal 210 from the retroreflective antenna array 200. The reflected signal 210 may have identical signal properties to the original signal 200, apart from its direction of propagation.

FIG. 2B illustrates one embodiment of signal reflection with modulation, comprising the source 100, signal 110, modulated signal 220, and retroreflective antenna array 200. As shown in FIG. 2B, the signal 110 may originate from the source 100 and be reflected as a modulated signal 220 from the retroreflective antenna array 200. The modulated signal 210 may be similar to the original signal 110, but have had its amplitude modulated in at least one portion.

Figure 3:
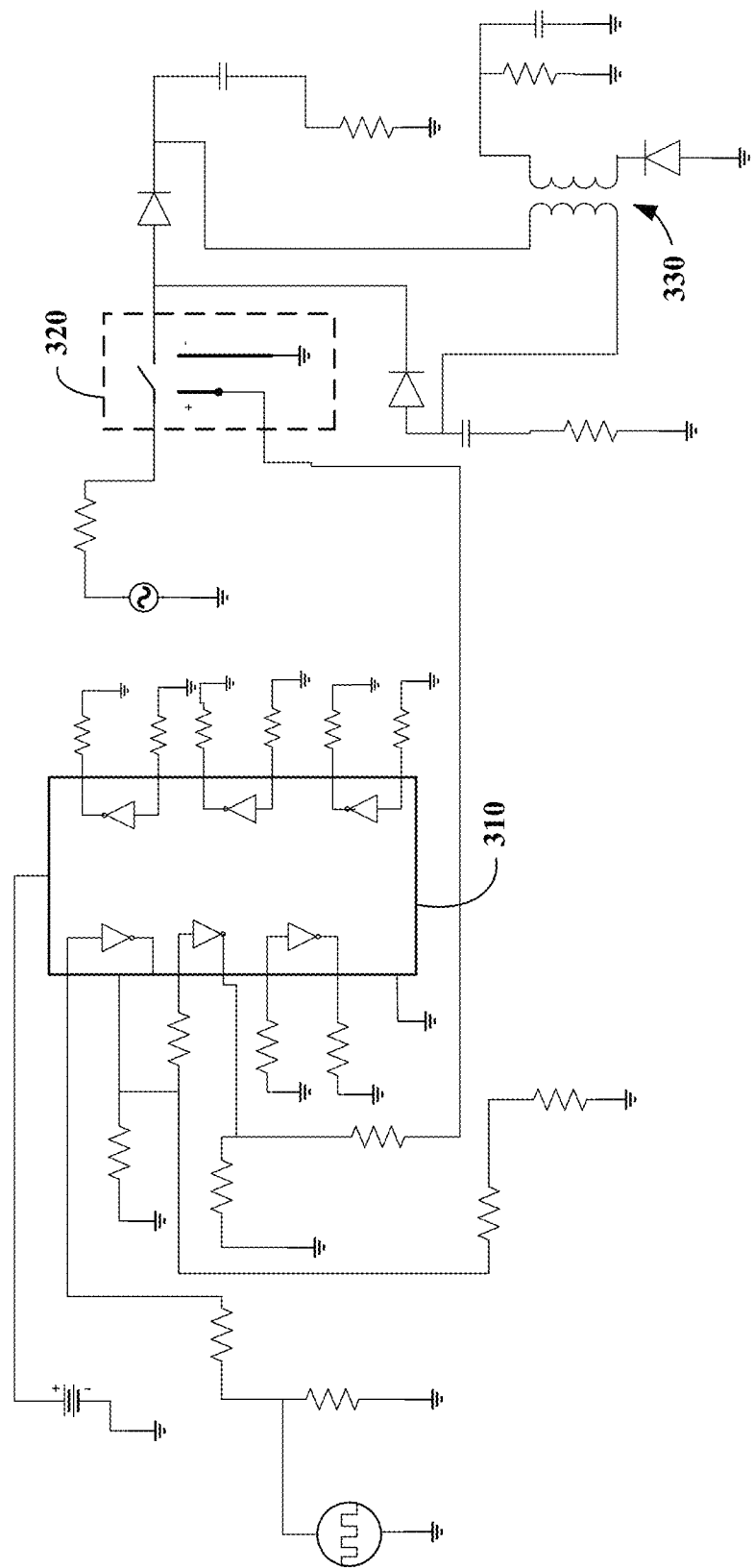
FIG. 3 shows an exemplary electrical diagram for an antenna for passive signal reflection of unique identifiers.

FIG. 3 shows an exemplary modulation circuit for an antenna array, comprising an inverter 310, a plurality of switches 320, and diode detector 330. In one embodiment, this modulator may utilize 24 or 32 bit code, 10 microsecond loop, 16 gigahertz frequency, and a diode detector 330. The plurality of switches 320 may perform amplitude modulation of the signal 110 to effectively turn the signal "on" or "off". Consequently, this allows the modulated signal 220 to pulsate, wherein the pattern of the pulses represents a code. Moreover, the diode detector 330 may perform amplitude modulation to embed a code in the modulated signal. The code may comprise a variety of information. In one embodiment, the code may comprise a unique identifier associated with the retroreflective antenna array 200. Additionally, the code may comprise function codes and/or information codes. Finally, this modulation circuit may modulate the signal 110 passively, wherein the circuit operates without an active power source.

Figure 4:
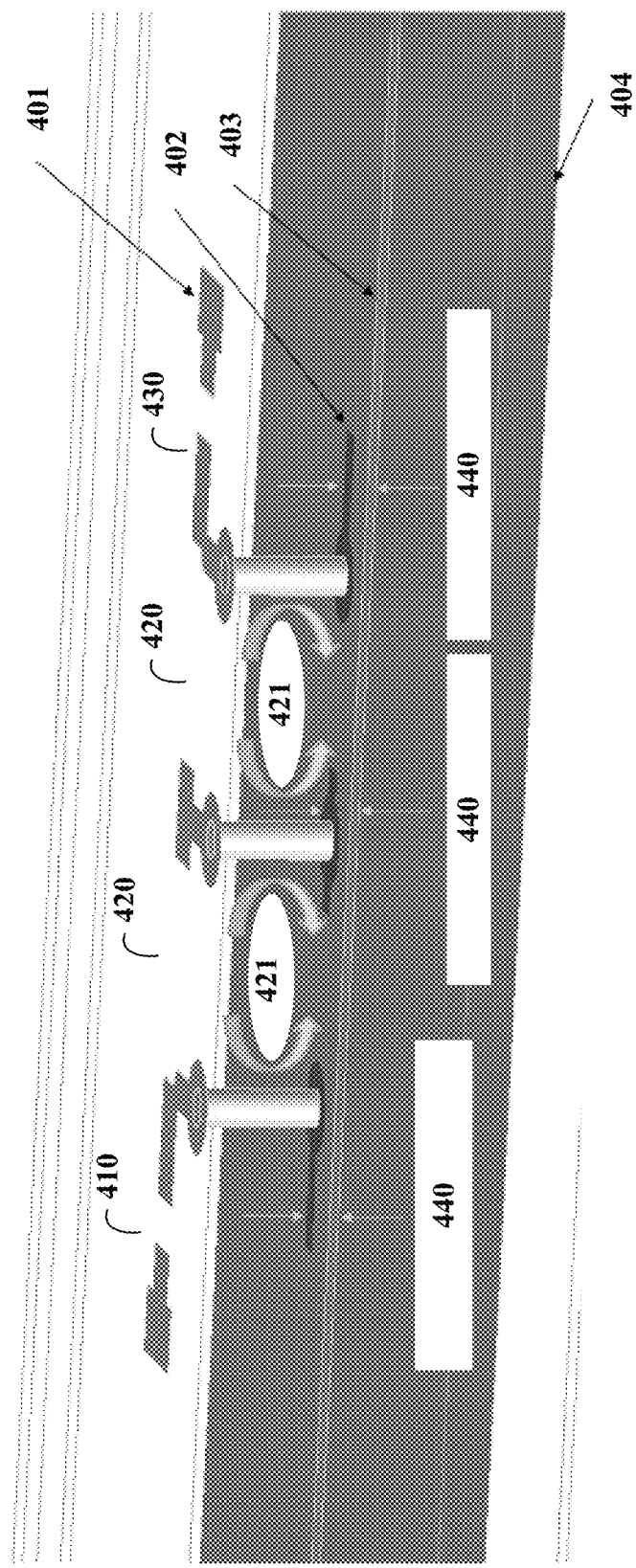
FIG. 4 shows exemplary transmission line responses when the plurality of diodes are on/off, based on the layout and switch of FIG. 3.

FIG. 4 shows a RF Layout and RF Switch, corresponding to switch 320 shown in FIG. 3, comprising a circuit layer 401, coupling layer 402, T-line layer 403, ground layer 404, inductor 410, plurality of diodes 420, plurality of coupling loops, resistor 430, and broadside coupling 440. This RF Layout and RF Switch passively modulate the amplitude of the signal 110 to turn it into modulated signal 220. While this RF Layout and RF Switch may be described as an on/off switch, is may also be described as a multiple stage notch filter designed to attenuate certain frequencies, which is switchable to "on" and bypass ("off") modes. Furthermore, the components of this RF Switch are variable, depending on the frequency response you would like the RF switch to perform. Almost any RF frequency range is possible through scaling. If broader band notch is desired, one may add additional stages. This particular embodiment was designed to attenuate 15.7 to 17.7 GHz. The result of the transmission line from this layout and switch is shown, as an example, in FIG. 5.

Figure 5:
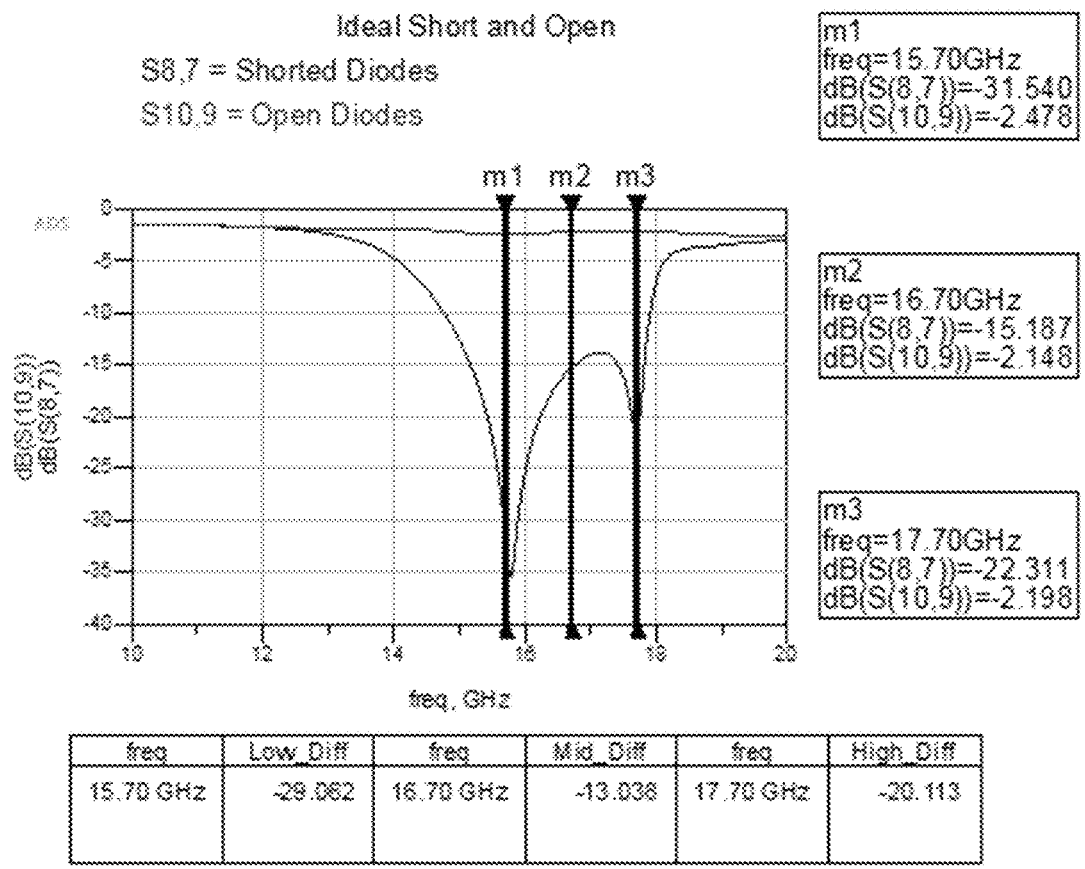
FIG. 5 shows a RF Layout and RF Switch, which may correspond to switch shown in FIG. 3.

FIG. 5 shows exemplary transmission line responses when the plurality of diodes 420 are on/off, based on the layout and switch of FIG. 4. The graph comprises two lines, one associated with shorted diodes and one associated with open diodes. The lines associated with open diodes is seen near the top of the graph, and the shorted diodes is shown dipping near 16 GHZ and 18 GHz. The measurements taken at m1, m2, and m3 in the graph shown in FIG. 5 illustrate an exemplary case of transmission line results when diodes. M1 is the result at 15.7 GHZ, where "on" produces a 31.54 dB insertion loss and "off" produces a 2.478 dB insertion loss. The difference between "on" and "off", in this example, is a dynamic range of 29.062 dB. Similarly, m2 is the middle of the band at 16.7 GHZ and m3 is the upper end of the frequency range at 17.7 GHZ. This dynamic range determines how well the switch modulates. Typically, a 10 dB dynamic range is considered sufficient for digital modulation. Accordingly, an "on" state or "off" state correlates with a dynamic range about 10 dB. By leveraging these on and off states, the transmission line can be passively modulated. Moreover, the modulation may encode information such as a unique ID, coded information and more.

While FIG. 5 is one embodiment of a transmission line response from a RF switch, the filter may be made broader band by adding more visa and resonant stages. When looking at the resonant structure on FIG. 4, you will see 3 vias. This represents two places of resonance as seen on the FIG. 5 plot. If you required more places of resonance to make the filter broader band, you could add more vias and resonant stages. There are 3 vias shown in FIG. 4, which represents the two places of resonance shown in FIG. 5.

Figure 6:
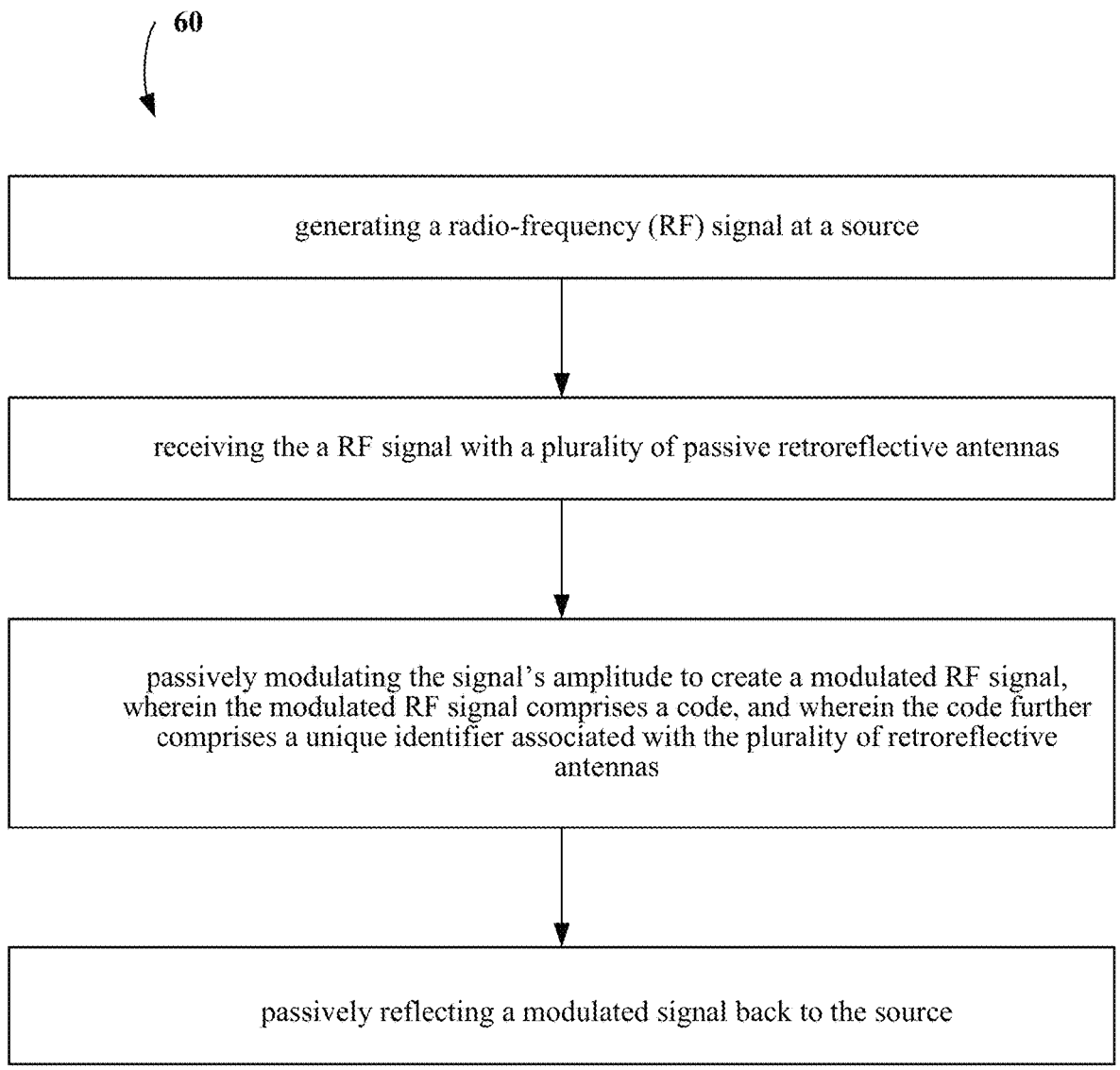
FIG. 6 shows a flow-diagram of a method for passively reflecting modulated signals.

FIG. 6 shows a flow-diagram of a method for passively reflecting modulated signals 60, comprising: generating a radiofrequency (RF) signal at a source; receiving the a RF signal with a plurality of retroreflective antennas; passively modulating the signal's amplitude to create a modulated RF signal, wherein the modulated RF signal comprises a code, and wherein the code further comprises a unique identifier associated with the plurality of retroreflective antennas; and passively reflecting a modulated signal back to the source. The method for passively reflecting modulated signals 60 may also include wherein the RF signal is a microwave signal. The method for passively reflecting modulated signals 60 may also include wherein the RF signal is a narrow-beam circularly polarized radar signal. The method for passively reflecting modulated signals 60 may also include wherein the plurality of retroreflective antennas are coupled to a satellite. The method for passively reflecting modulated signals 60 may also include wherein the source is a ground station. The method for passively reflecting modulated signals 60 may also include wherein the unique identifier comprises a sequence of either "on" or "off" states.

From the above description of an Antenna Array for Passively Modulating Radio Frequency Signals, it is manifest that various techniques may be used for implementing the concepts of an antenna array, an antenna system, and method for passively reflecting modulated signals without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that antenna array, an antenna system, and method for passively reflecting modulated signals are not limited to the particular embodiments described herein, but is capable of many embodiments without departing from the scope of the claims.

What is claimed:

1. An antenna array, comprising:
   a plurality of retroreflective antennas configured to passively receive a radiofrequency (RF) signal from a source, and configured to reflect the RF signal; and
   a passive modulation circuit, electrically connected to the plurality of retroreflective antennas, configured to modulate the RF signal to represent a code, wherein the code comprises information, and further comprising:
   a plurality of RF switches, each RF switch further comprising an inductor, a plurality of diodes having a coupling loop, and a resistor.

2. The antenna array of claim 1, further comprising:
   a diode detector.

3. The antenna array of claim 1, wherein the RF signal is a microwave signal.

4. The antenna array of claim 1, wherein the RF signal is a narrow-beam circularly polarized radar signal.

5. The antenna array of claim 1, wherein the plurality of retroreflective antennas is coupled to a satellite.

6. The antenna array of claim 1, wherein the source is a ground station.

7. The antenna array of claim 1, wherein the code comprises a unique identifier associated with the antenna array.

8. The antenna array of claim 7, wherein the unique identifier comprises a sequence of either "on" or "off" states.

9. The antenna array of claim 1, wherein the code comprises function codes and information codes.

\* \* \* \* \*